United States Patent
McCorkle et al.

(10) Patent No.: US 6,850,733 B2
(45) Date of Patent: Feb. 1, 2005

(54) METHOD FOR CONVEYING APPLICATION DATA WITH CARRIERLESS ULTRA WIDEBAND WIRELESS SIGNALS

(75) Inventors: John W. McCorkle, Vienna, VA (US); Martin Rofheart, Washington, DC (US)

(73) Assignee: Freescale Semiconductor, Inc., Austin, TX (US)

(*) Notice: Subject to any disclaimer, the term of this patent is extended or adjusted under 35 U.S.C. 154(b) by 0 days.

(21) Appl. No.: 10/268,666

(22) Filed: Oct. 11, 2002

(65) Prior Publication Data

US 2003/0054764 A1 Mar. 20, 2003

Related U.S. Application Data

(63) Continuation of application No. 09/685,201, filed on Oct. 10, 2000, now Pat. No. 6,505,032, and a continuation-in-part of application No. 09/209,460, filed on Dec. 11, 1998, now Pat. No. 6,700,939.

(51) Int. Cl.[7] .................................................. H04B 7/00
(52) U.S. Cl. ...................... 455/41.2; 455/23; 455/118; 455/130; 375/280; 375/285
(58) Field of Search .......................... 455/41.2, 23, 118, 455/39, 62, 454, 91, 130; 375/219, 266, 295, 271, 280–283, 286, 256; 370/351, 352

(56) References Cited

U.S. PATENT DOCUMENTS

| | | | | |
|---|---|---|---|---|
| 4,641,317 A | * | 2/1987 | Fullerton | 375/130 |
| 5,345,471 A | * | 9/1994 | McEwan | 375/130 |
| 5,351,053 A | * | 9/1994 | Wicks et al. | 342/158 |
| 5,523,760 A | * | 6/1996 | McEwan | 342/89 |
| 5,533,046 A | * | 7/1996 | Lund | 375/130 |
| 5,583,892 A | * | 12/1996 | Drakul et al. | 375/353 |
| 5,589,838 A | * | 12/1996 | McEwan | 342/387 |
| 5,677,929 A | * | 10/1997 | Asano et al. | 375/141 |
| 5,687,169 A | * | 11/1997 | Fullerton | 370/324 |
| 5,832,035 A | * | 11/1998 | Fullerton | 375/149 |
| 5,901,172 A | * | 5/1999 | Fontana et al. | 375/130 |
| 6,026,125 A | * | 2/2000 | Larrick et al. | 375/295 |
| 6,505,032 B1 | * | 1/2003 | McCorkle et al. | 455/41.2 |

* cited by examiner

Primary Examiner—Sonny Trinh
(74) Attorney, Agent, or Firm—Posz & Bethards, PLC

(57) ABSTRACT

A method for conveying application data via carrierless ultra wideband wireless signals, and signals embodied in a carrierless ultra wideband waveform. Application data is encoded into wavelets that are transmitted as a carrierless ultra wideband waveform. The carrierless ultra wideband waveform is received by an antenna, and the application data is decoded from the wavelets included in the waveform. The waveforms of the signals include wavelets that have a predetermined shape that is used to modulate the data. The signals may convey, for example, Web pages and executable programs between mobile devices. The signals are low power and can penetrate obstructions making them favorable for use with a wireless node of a network.

20 Claims, 4 Drawing Sheets

METHOD FOR CONVEYING APPLICATION DATA WITH CARRIERLESS ULTRA WIDEBAND WIRELESS SIGNALS

CROSS-REFERENCE TO RELATED PATENT DOCUMENTS

This application is a continuation-in-part of U.S. application Ser. No. 09/685,201, for "CARRIERLESS ULTRA WIDEBAND WIRELESS SIGNALS FOR CONVEYING APPLICATION DATA," filed Oct. 10, 2000 now U.S. Pat. No. 6,505,032, and U.S. application Ser. No. 09/209,460, for "ULTRA WIDE BANDWIDTH SPREAD-SPECTRUM COMMUNICATIONS SYSTEM," filed Dec. 11, 1998 now U.S. Pat. No. 6,700,939, the contents of both of which are incorporated by reference in their entirety.

The present document contains subject matter related to that disclosed in commonly owned, co-pending application Ser. No. 09/209,460 filed Dec. 11, 1998, entitled ULTRA WIDE BANDWIDTH SPREAD-SPECTRUM COMMUNICATIONS SYSTEM; Ser. No. 09/633,815 filed Aug. 7, 2000 entitled ELECTRICALLY SMALL PLANAR UWB ANTENNA; application Ser. No. 09/563,292, filed May 3, 2000 entitled PLANAR ULTRA WIDE BAND ANTENNA WITH INTEGRATED ELECTRONICS; Application Serial No. 60/207,225 filed May 26, 2000, entitled ULTRA WIDE BAND COMMUNICATIONS SYSTEM AND METHOD; application Ser. No. 09/685,198 filed Oct. 10, 2000, entitled ANALOG SIGNAL SEPARATOR FOR UWB VERSUS NARROWBAND SIGNALS; Application Serial No. 60/238,466 filed Oct. 10, 2000, entitled ULTRA WIDE BANDWIDTH NOISE CANCELLATION MECHANISM AND METHOD; Application Serial No. 60/217,099 filed Jul. 10, 2000 entitled MULTIMEDIA WIRELESS PERSONAL AREA SYSTEM NETWORK (WPAN) PHYSICAL LAYER SYSTEM AND METHOD; application Ser. No. 09/685,203 filed Oct. 10, 2000, entitled SYSTEM AND METHOD FOR BASEBAND REMOVAL OF NARROWBAND INTERFERENCE IN ULTRA WIDEBAND SIGNALS; application Ser. No. 09/685,197 filed Oct. 10, 2000, entitled MODE CONTROLLER FOR SIGNAL ACQUISITION AND TRACKING IN AN ULTRA WIDEBAND COMMUNICATION SYSTEM; application Ser. No. 09/684,400 filed Oct. 10, 2000, entitled ULTRA WIDEBAND COMMUNICATION SYSTEM, METHOD, AND DEVICE WITH LOW NOISE PULSE FORMATION; application Ser. No. 09/685,195 entitled ULTRA WIDE BANDWIDTH SYSTEM AND METHOD FOR FAST SYNCHRONIZATION; application Ser. No. 09/684,401 filed Oct. 10, 2000, entitled ULTRA WIDE BANDWIDTH SYSTEM AND METHOD FOR FAST SYNCHRONIZATION USING SUB CODE SPINS; application Ser. No 09/685,196 filed Oct. 10, 2000, entitled ULTRA WIDE BANDWIDTH SYSTEM AND METHOD FOR FAST SYNCHRONIZATION USING MULTIPLE DETECTION ARMS; application Ser. No. 09/685,199 filed Oct. 10, 2000, entitled A LOW POWER, HIGH RESOLUTION TIMING GENERATOR FOR ULTRA-WIDE BANDWIDTH COMMUNICATIONS SYSTEMS; application Ser. No. 09/685, 202 filed Oct. 10, 2000, entitled METHOD AND SYSTEM FOR ENABLING DEVICE FUNCTIONS BASED ON DISTANCE INFORMATION; application Ser. No., 09/685, 201 filed Oct. 10, 2000, entitled CARRIERLESS ULTRA WIDEBAND WIRELESS SIGNALS FOR CONVEYING APPLICATION DATA; application Ser. No., 09/685,205 filed Oct. 10, 2000, entitled SYSTEM AND METHOD FOR GENERATING ULTRA WIDEBAND PULSES; application Ser. No., 09/684,782 filed Oct. 10, 2000, entitled ULTRA WIDEBAND COMMUNICATION SYSTEM, METHOD, AND DEVICE WITH LOW NOISE RECEPTION; and application Ser. No., 09/685,200 filed Oct. 10, 2000, entitled LEACKAGE NULLING RECEIVER CORRELATOR STRUCTURE AND METHOD FOR ULTRA WIDE BANDWIDTH COMMUNICATION SYSTEM, the entire contents of each of which being incorporated herein by reference.

STATEMENT REGARDING GOVERNMENT INTEREST

The Government of the United States of America, as represented by the Secretary of the Army, has certain non-exclusive license rights to the Invention as set forth in rights determination ARL No. 998-679-16.

BACKGROUND OF THE INVENTION

1. Field of the Invention

The present invention is directed to methods and signals for ultra wideband communications, and more particularly to methods and signals for conveying application data via carrierless ultra wideband wireless signals.

2. Discussion of the Background

Digital information typically takes the form of a stream of binary pulses of a square wave, each pulse representing a bit (i.e., 1 or 0) of data. To transmit a digital stream of data, it is well known to use the digital data stream to modulate a carrier waveform and to transmit the modulated carrier waveform rather than the digital waveform. By using modulation, a carrier waveform can be used that is most compatible with the transmission channel. Typically, these waveforms are high-frequency sinusoids for transmitting signals through space.

A discussion of the reasons data signals are modulated onto carriers is included in Sklar, B., "Digital Communications: Fundamentals and Applications," Prentice Hall, 1988, p. 118, the entire contents of which are incorporated herein by reference. Signals are launched into space via antennas. The design of an antenna is dependent on the wavelength, $\lambda$, of the signal being transmitted. A practical example illustrates one reason why signals are modulated onto high-frequency carrier waves. The wavelength, $\lambda$, of a signal is equal to c/f, where c is the speed of light, or $3 \times 10^8$ m/s, and f is the frequency of the frequency of the signal being transmitted in Hz. It is well known by those of ordinary skill in the digital communication art that the aperture of an antenna should be at least as large as the wavelength being transmitted (see Sklar, at p. 118). Given this design constraint, it can be shown that a signal with a frequency, f, of 3000 Hz has a wavelength, $\lambda$, of c/f, or $10^5$ m, which is approximately 60 miles. Of course, it is not realistic to build an antenna with a 60 mile aperture. However, if that same signal is modulated onto a 30 GHz carrier prior to transmitting it, the antenna can have an aperture of less than ½ inch (see Sklar, at p. 118).

Another consideration is the bandwidth required to transmit an ideal square wave. An unmodulated, unshaped ideal square wave requires an infinite amount of bandwidth in the frequency domain. For this reason, it is well known to shape the digital pulses using a filter that will round the edges of the square wave, thereby narrowing the bandwidth of the transmitted signal. Pulse shaping and modulation are discussed in Webb, W., "The Complete Wireless Communications Professional: A Guide for Engineers and Managers," Artech House Publishers, 1999, pp. 55–64, the entire contents of which is incorporated herein by reference.

When digital information is modulated onto a carrier and transmitted through space, the power spectral density of that signal tends to be concentrated about the frequency of the carrier itself. These signals are normally generated with large antennas and at high power so that the signal is not interfered with by noise. The frequency spectrum is, of course, regulated in the United States by the Federal Communications Commission (FCC). Regulation of the frequency spectrum ensures that there will not be interference within the various allocated frequency ranges. Since all frequency bands contain noise, there is no practical reason to regulate transmissions that are lower than the noise.

With the popularization of the Internet, laptop personal computers, personal digital assistants (PDAs), and cellular telephones, society has become more and more dependent on the availability of information and the ability to share information. With the miniaturization of computing power, many users of information are now demanding mobile access to their information. Using conventional methods, exchanging, and sharing information requires access to network via a telephone connection, or through a direct connection to the network itself. The need for a network limits access to and sharing of information to those that can access the network.

The challenge, then, as presently recognized, is to develop an approach for transmitting and receiving information using, for example, mobile devices such as PDAs, cellular telephones, and laptop personal computers. It would be advantageous if the approach was wireless, eliminating the need for direct connection between the sharing devices. It would be advantageous if the approach were to employ communications techniques that would not fall under the jurisdiction of regulatory agencies, thereby allowing for global use.

SUMMARY OF THE INVENTION

An object of the present invention is to provide a method for communicating information using carrierless wireless signals.

The inventors of the present invention have recognized that low power carrierless transmissions can be effectively used to communicate at high data rates without interfering with narrowband or spread spectrum signals, and if the power is kept sufficiently low, the transmissions do not need to be as broadcast devices. Accordingly, another object of the present invention is to encode digital data into multi-phase wavelets that can be transmitted without a carrier at low power and at high data rates over short distances.

In one embodiment, the present invention is implemented as a method for conveying application data with carrierless ultra wideband wireless signals. The application data is encoded into wavelets that are transmitted without modulating them onto a carrier waveform. In another embodiment, the present invention is implemented as a computer data signal that is embodied in a carrierless ultra wideband waveform.

Consistent with the title of this section, the above summary is not intended to be an exhaustive discussion of all the features or embodiments of the present invention. A more complete, although not necessarily exhaustive, description of the features and embodiments of the invention is found in the section entitled "DESCRIPTION OF THE PREFERRED EMBODIMENTS."

BRIEF DESCRIPTION OF THE DRAWINGS

A more complete appreciation of the present invention, and many of the attendant advantages thereof, will be readily obtained as the same becomes better understood by reference to the following detailed description when considered in connection with the accompanying drawings, wherein.

DETAILED DESCRIPTION OF THE PREFERRED EMBODIMENTS

Figure 1A:
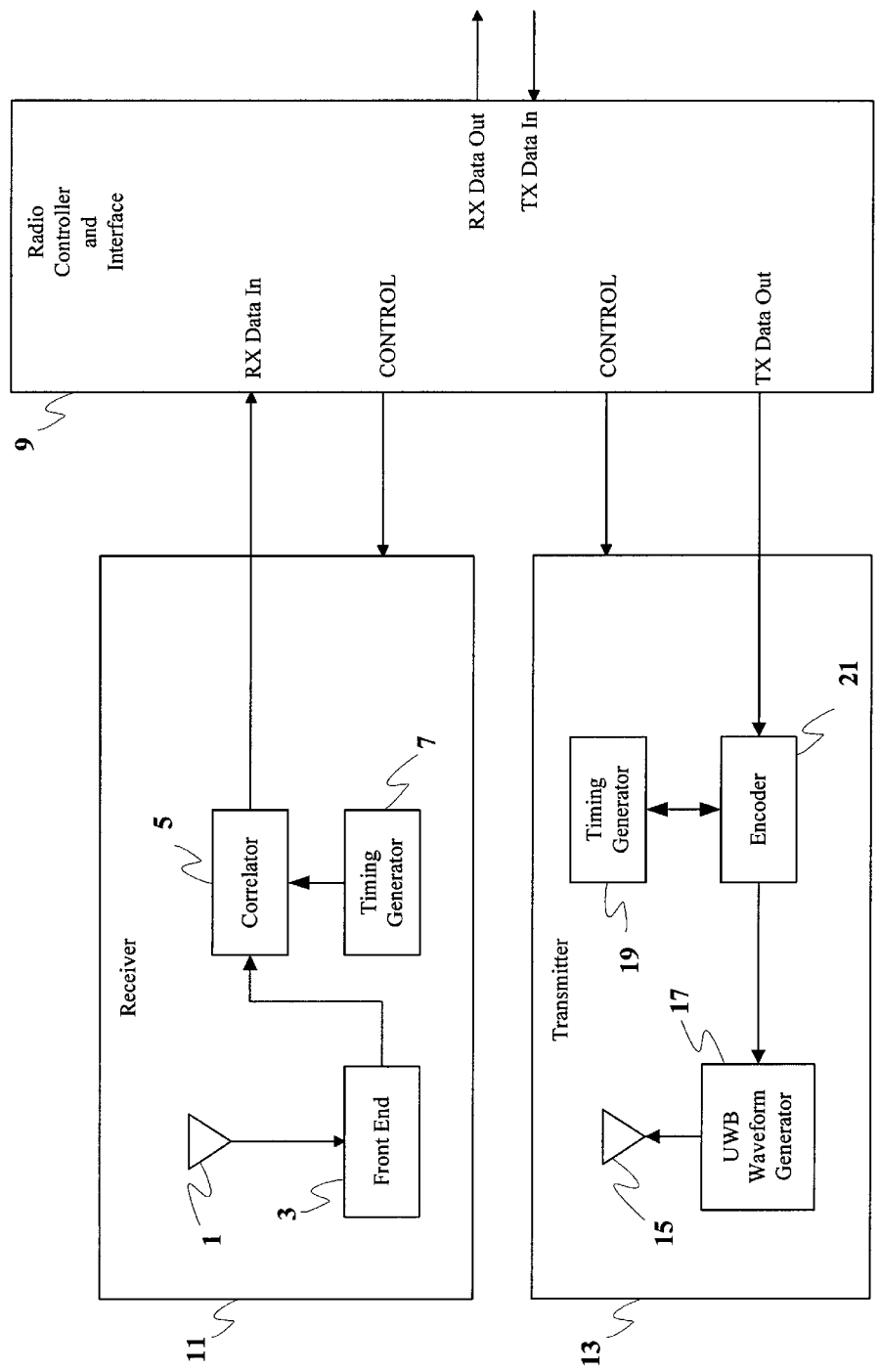
FIG. 1a is a block diagram of an ultra-wide band (UWB) transceiver, according to the present invention.

FIG. 1a is a block diagram of an ultra-wide band (UWB) transceiver. In FIG. 1a, the transceiver includes three major components, namely, receiver 11, radio controller and interface 9, and transmitter 13. Alternatively, the system may be implemented as a separate receiver 11 and radio controller and interface 9, and a separate transmitter 13 and radio controller and interface 9. The radio controller and interface 9 serves as a media access control (MAC) interface between the UWB wireless communication functions implemented by the receiver 11 and transmitter 13 and applications that use the UWB communications channel for exchanging data with remote devices.

The receiver 11 includes an antenna 1 that converts a UWB electromagnetic waveform into an electrical signal (or optical signal) for subsequent processing. The UWB signal is generated with a sequence of shape-modulated wavelets, where the occurrence times of the shape-modulated wavelets may also be modulated. For analog modulation, at least one of the shape control parameters is modulated with the analog signal. More typically, the wavelets take on M possible shapes. Digital information is encoded to use one or a combination of the M wavelet shapes and occurrence times to communicate information.

In one embodiment of the present invention, each wavelet communicates one bit, for example, using two shapes such as bi-phase. In other embodiments of the present invention, each wavelet may be configured to communicate nn bits, where $M \geq 2^{nn}$. For example, four shapes may be configured to communicate two bits, such as with quadrature phase or four-level amplitude modulation. In another embodiment of the present invention, each wavelet is a "chip" in a code sequence, where the sequence, as a group, communicates one or more bits. The code can be M-ary at the chip level, choosing from M possible shapes for each chip.

At the chip, or wavelet level, embodiments of the present invention produce UWB waveforms. The UWB waveforms are modulated by a variety of techniques including but not limited to: (i) bi-phase modulated signals (+1, −1), (ii) multilevel bi-phase signals (+1, −1, +a1, −a1, +a2, −a2, . . . , +aN, −aN), (iii) quadrature phase signals (+1, −1, +j, −j), (iv) multi-phase signals (1, −1, exp(+jπ/N), exp(−jπ/N), exp(+jπ2/N), exp(−jπ2/N), . . . , exp(+j(N−1)/N), exp(−jπ(N−1)/N)), (v) multilevel multi-phase signals ($a_i$ exp(j2πβ/N)| $a_i \in \{1, a1, a2, \ldots, aK\}$, $\beta \in \{0, 1, \ldots, N-1\}$), (vi) frequency modulated pulses, (vii) pulse position modulation (PPM) signals (possibly same shape pulse transmitted in different candidate time slots), (viii) M-ary modulated waveforms $g_{B_i}(t)$ with $B_i \in \{1, \ldots, M\}$, and (ix) any combination of the above waveforms, such as multi-phase channel symbols transmitted according to a chirping signaling scheme. The present invention, however, is applicable to variations of the above modulation schemes and other modulation schemes (e.g., as described in *Lathi*, "Modern Digital and Analog Communications Systems," Holt, Rinehart and Winston, 1998, the entire contents of which is incorporated by reference herein), as will be appreciated by those skilled in the relevant art(s).

Some exemplary waveforms and characteristic equations thereof will now be described. The time modulation component, for example, can be defined as follows. Let $t_i$ be the time spacing between the $(i-1)^{th}$ pulse and the $i^{th}$ pulse. Accordingly, the total time to the $i^{th}$ pulse is $$T_i = \sum_{j=0}^{i} t_j.$$

The signal $T_i$ could be encoded for data, part of a spreading code or user code, or some combination thereof. For example, the signal $T_i$ could be equally spaced, or part of a spreading code, where $T_i$ corresponds to the zero-crossings of a chirp, i.e., the sequence of $T_i$'s, and where $$T_i = \sqrt{\frac{i-a}{k}}$$

for a predetermined set of a and k. Here, a and k may also be chosen from a finite set based on the user code or encoded data.

An embodiment of the present invention can be described using M-ary modulation. Equation 1 below can be used to represent a sequence of exemplary transmitted or received pulses, where each pulse is a shape modulated UWB wavelet, $g_{B_i}(t-T_i)$.

$$x(t) = \sum_{i=0}^{\infty} g_{B_i}(t - T_i) \tag{1}$$

In the above equation, the subscript i refers to the $i^{th}$ pulse in the sequence of UWB pulses transmitted or received. The wavelet function g has M possible shapes, and therefore $B_i$ represents a mapping from the data, to one of the M-ary modulation shapes at the $i^{th}$ pulse in the sequence. The wavelet generator hardware (e.g., the UWB waveform generator 17) has several control lines (e.g., coming from the radio controller and interface 9) that govern the shape of the wavelet. Therefore, $B_i$ can be thought of as including a lookup-table for the M combinations of control signals that produce the M desired wavelet shapes. The encoder 21 combines the data stream and codes to generate the M-ary states. Demodulation occurs in the waveform correlator 5 and the radio controller and interface 9 to recover to the original data stream. Time position and wavelet shape are combined into the pulse sequence to convey information, implement user codes, etc.

In the above case, the signal is comprised of wavelets from i=1 to infinity. As i is incremented, a wavelet is produced. Equation 2 below can be used to represent a generic wavelet pulse function, whose shape can be changed from pulse to pulse to convey information or implement user codes, etc.

$$g_{B_i}(t) = Re(B_{i,1}) \cdot f_{B_{i,2}, B_{i,3}, \ldots}(t) + Im(B_{i,1}) \cdot h_{B_{i,2}, B_{i,3}, \ldots}(t) \tag{2}$$

In the above equation, function f defines a basic wavelet shape, and function h is simply the Hilbert transform of the function f. The parameter $B_{i,1}$ is a complex number allowing the magnitude and phase of each wavelet pulse to be adjusted, i.e., $B_{i,1} = a_i \angle \theta_i$, where $a_i$ is selected from a finite set of amplitudes and $\theta_i$ is selected from a finite set of phases. The parameters $\{B_{i,2}, B_{i,3}, \ldots\}$ represent a generic group of parameters that control the wavelet shape.

An exemplary waveform sequence x(t) can be based on a family of wavelet pulse shapes f that are derivatives of a Guassian waveform as defined by Equation 3 below.

$$f_{B_i}(t) = \Psi(B_{i,2}, B_{i,3}) \left( \frac{d^{B_{i,3}}}{dt^{B_{i,3}}} e^{-[B_{i,2}t]^2} \right) \tag{3}$$

In the above equation, the function $\Psi(\ )$ normalizes the peak absolute value of $f_{B_i}(t)$ to 1. The parameter $B_{i,2}$ controls the pulse duration and center frequency. The parameter $B_{i,3}$ is the number of derivatives and controls the bandwidth and center frequency.

Another exemplary waveform sequence x(t) can be based on a family of wavelet pulse shapes f that are Gaussian weighted sinusoidal functions, as described by Equation 4 below.

$$f_{B_{i,2}, B_{i,3}, B_{i,4}} = f_{\omega_i, k_i, b_i}(t) = e^{-[b_i t]^2} \sin(\omega_i t + k_i t^2). \tag{4}$$

In the above equation, $b_i$ controls the pulse duration, $\omega_i$ controls the center frequency, and $k_i$ controls a chirp rate. Other exemplary weighting functions, beside Gaussian, that are also applicable to the present invention include, for example, Rectangular, Hanning, Hamming, Blackman-Harris, Nutall, Taylor, Kaiser, Chebychev, etc.

Another exemplary waveform sequence x(t) can be based on a family of wavelet pulse shapes f that are inverse-exponentially weighted sinusoidal functions, as described by Equation 5 below.

$$g_{B_i}(t) = \left( \frac{1}{e^{\frac{-(t-t1_i)}{.3*tr_i}} + 1} - \frac{1}{e^{\frac{-(t-t2_i)}{.3*tf_i}} + 1} \right) \cdot \sin(\theta_i + \omega_i t + k_i t^2) \tag{5}$$

where $\{B_{i,2}, B_{i,3}, B_{i,4}, B_{i,5}, B_{i,6}, B_{i,7}, B_{i,8}\} = \{t_{1_i}, t_{2_i}, t_{r_i}, t_{f_i}, \theta_i, \omega_i, k_i\}$ In the above equation, the leading edge turn on time is controlled by $t_1$, and the turn-on rate is controlled by $t_r$. The trailing edge turn-off time is controlled by $t_2$, and the turn-off rate is controlled by $t_f$. Assuming the chirp starts at t=0 and $T_D$ is the pulse duration, the starting phase is controlled by $\theta$, the starting frequency is controlled by $\omega$, the chirp rate is controlled by k, and the stopping frequency is controlled by $\omega + kT_D$. An example assignment of parameter values is $\omega=1$, $t_r = t_f = 0.25$, $t_1 = t_r/0.51$, and $t_2 = t_D - t_r/9$.

A feature of the present invention is that the M-ary parameter set used to control the wavelet shape is chosen so as to make a UWB signal, wherein the center frequency $f_c$ and the bandwidth B of the power spectrum of g(t) satisfies $2f_c > B > 0.25 f_c$. It should be noted that conventional equations define in-phase and quadrature signals (e.g., often referred to as I and Q) as sine and cosine terms. An important observation, however, is that this conventional definition is inadequate for UWB signals. The present invention recognizes that use of such conventional definition may lead to DC offset problems and inferior performance.

Furthermore, such inadequacies get progressively worse as the bandwidth moves away from $0.25 f_c$ and toward $2 f_c$. A key attribute of the exemplary wavelets (or e.g., those described in co-pending U.S. patent application Ser. No. 09/209,460) is that the parameters are chosen such that neither f nor h in Equation 2 above has a DC component, yet f and h exhibit the required wide relative bandwidth for UWB systems.

Similarly, as a result of $B>0.25f_c$, it should be noted that the matched filter output of the UWB signal is typically only a few cycles, or even a single cycle. For example, the parameter n in Equation 3 above may only take on low values (e.g., such as those described in co-pending U.S. patent application Ser. No. 09/209,460).

Figure 1B:
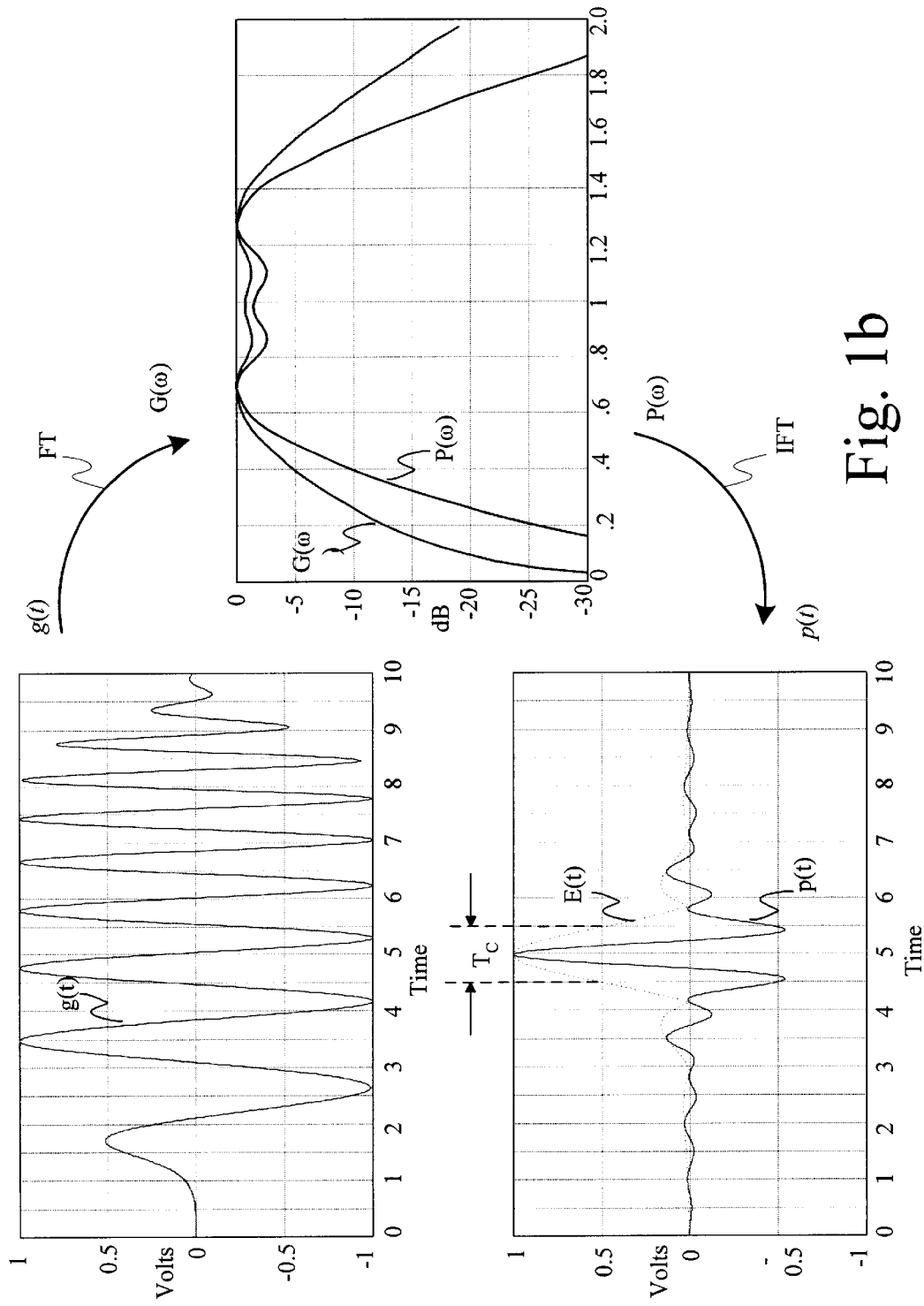
FIG. 1b is a diagram for illustrating the operation of the transceiver of FIG. 1a, according to the present invention.

The compressed (i.e., coherent matched filtered) pulse width of a UWB, wavelet will now be defined with reference to FIG. 1b. In FIG. 1b, the time domain version of the wavelet thus represents g(t) and the Fourier transform (FT) version is represented by G($\omega$). Accordingly, the matched filter is represented as $G^*(\omega)$, the complex conjugate, so that the output of the matched filter is $P(\omega)=G(\omega) \cdot G^*(\omega)$. The output of the matched filter in the time domain is seen by performing an inverse Fourier transform (IFT) on P($\omega$) so as to obtain p(t), the compressed or matched filtered pulse. The width of the compressed pulse p(t) is defined by $T_C$, which is the time between the points on the envelope of the compressed pulse E(t) that are 6 dB below the peak thereof, as shown in FIG. 1b. The envelope waveform E(t) may be determined by Equation 6 below.

$$E(t)=\sqrt{(p(t))^2+(p^{H(t)})^2} \qquad (6)$$

where $p^H(t)$ is the Hilbert transform of p(t).

Accordingly, the above-noted parameterized waveforms are examples of UWB wavelet functions that can be controlled to communicate information with a large parameter space for making codes with good resulting autocorrelation and cross-correlation functions. For digital modulation, each of the parameters is chosen from a predetermined list according to an encoder that receives the digital data to be communicated. For analog modulation, at least one parameter is changed dynamically according to some function (e.g., proportionally) of the analog signal that is to be communicated.

Referring back to FIG. 1a, the electrical signals coupled in through the antenna 1 are passed to a radio front end 3. Depending on the type of waveform, the radio front end 3 processes the electric signals so that the level of the signal and spectral components of the signal are suitable for processing in the UWB waveform correlator 5. The UWB waveform correlator 5 correlates the incoming signal (e.g., as modified by any spectral shaping, such as a matched filtering, partially matched filtering, simply roll-off, etc., accomplished in front end 3) with different candidate signals generated by the receiver 11, so as to determine when the receiver 11 is synchronized with the received signal and to determine the data that was transmitted.

The timing generator 7 of the receiver 11 operates under control of the radio controller and interface 9 to provide a clock signal that is used in the correlation process performed in the UWB waveform correlator 5. Moreover, in the receiver 11, the UWB waveform correlator 5 correlates in time a particular pulse sequence produced at the receiver 11 with the receive pulse sequence that was coupled in through antenna 1 and modified by front end 3. When the two such sequences are aligned with one another, the UWB waveform correlator 5 provides high signal to noise ratio (SNR) data to the radio controller and interface 9 for subsequent processing. In some circumstances, the output of the UWB waveform correlator 5 is the data itself. In other circumstances, the UWB waveform correlator 5 simply provides an intermediate correlation result, which the radio controller and interface 9 uses to determine the data and determine when the receiver 11 is synchronized with the incoming signal.

In some embodiments of the present invention, when synchronization is not achieved (e.g., during a signal acquisition mode of operation), the radio controller and interface 9 provides a control signal to the receiver 11 to acquire synchronization. In this way, a sliding of a correlation window within the UWB waveform correlator 5 is possible by adjustment of the phase and frequency of the output of the timing generator 7 of the receiver 11 via a control signal from the radio controller and interface 9. The control signal causes the correlation window to slide until lock is achieved. The radio controller and interface 9 is a processor-based unit that is implemented either with hard wired logic, such as in one or more application specific integrated circuits (ASICs) or in one or more programmable processors.

Once synchronized, the receiver 11 provides data to an input port ("RX Data In") of the radio controller and interface 9. An external process, via an output port ("RX Data Out") of the radio controller and interface 9, may then use this data. The external process may be any one of a number of processes performed with data that is either received via the receiver 11 or is to be transmitted via the transmitter 13 to a remote receiver.

During a transmit mode of operation, the radio controller and interface 9 receives source data at an input port ("TX Data In") from an external source. The radio controller and interface 9 then applies the data to an encoder 21 of the transmitter 13 via an output port ("TX Data Out"). In addition, the radio controller and interface 9 provides control signals to the transmitter 13 for use in identifying the signaling sequence of UWB pulses. In some embodiments of the present invention, the receiver 11 and the transmitter 13 functions may use joint resources, such as a common timing generator and/or a common antenna, for example. The encoder 21 receives user coding information and data from the radio controller and interface 9 and preprocesses the data and coding so as to provide a timing input for the UWB waveform generator 17, which produces UWB pulses encoded in shape and/or time to convey the data to a remote location.

The encoder 21 produces the control signals necessary to generate the required modulation. For example, the encoder 21 may take a serial bit stream and encode it with a forward error correction (FEC) algorithm (e.g., such as a Reed Solomon code, a Golay code, a Hamming code, a Convolutional code, etc.). The encoder 21 may also interleave the data to guard against burst errors. The encoder 21 may also apply a whitening function to prevent long strings of "ones" or "zeros." The encoder 21 may also apply a user specific spectrum spreading function, such as generating a predetermined length chipping code that is sent as a group to represent a bit (e.g., inverted for a "one" bit and non-inverted for a "zero" bit, etc.). The encoder 21 may divide the serial bit stream into subsets in order to send multiple bits per wavelet or per chipping code, and generate a plurality of control signals in order to affect any combination of the modulation schemes as described above (and/or as described in Lathi).

The radio controller and interface 9 may provide some identification, such as user ID, etc., of the source from which the data on the input port ("TX Data In") is received. In one embodiment of the present invention, this user ID may be inserted in the transmission sequence, as if it were a header of an information packet. In other embodiments of the present invention, the user ID itself may be employed to encode the data, such that a receiver receiving the transmission would need to postulate or have a priori knowledge of the user ID in order to make sense of the data. For example, the ID may be used to apply a different amplitude signal (e.g., of amplitude "f") to a fast modulation control signal to be discussed with respect to FIG. 2, as a way of impressing the encoding onto the signal.

The output from the encoder 21 is applied to a UWB waveform generator 17. The UWB waveform generator 17 produces a UWB pulse sequence of pulse shapes at pulse times according to the command signals it receives, which may be one of any number of different schemes. The output from the UWB generator 17 is then provided to an antenna 15, which then transmits the UWB energy to a receiver.

In one UWB modulation scheme, the data may be encoded by using the relative spacing of transmission pulses (e.g., PPM, chirp, etc.). In other UWB modulation schemes, the data may be encoded by exploiting the shape of the pulses as described above (and/or as described in Lathi). It should be noted that the present invention is able to combine time modulation (e.g., such as pulse position modulation, chirp, etc.) with other modulation schemes that manipulate the shape of the pulses.

There are numerous advantages to the above capability, such as communicating more than one data bit per symbol transmitted from the transmitter 13, etc. An often even more important quality, however, is the application of such technique to implement spread-spectrum, multi-user systems, which require multiple spreading codes (e.g., such as each with spike autocorrelation functions, and jointly with low peak cross-correlation functions, etc.).

In addition, combining timing, phase, frequency, and amplitude modulation adds extra degrees of freedom to the spreading code functions, allowing greater optimization of the cross-correlation and autocorrelation characteristics. As a result of the improved autocorrelation and cross-correlation characteristics, the system according to the present invention has improved capability, allowing many transceiver units to operate in close proximity without suffering from interference from one another.

Figure 2:
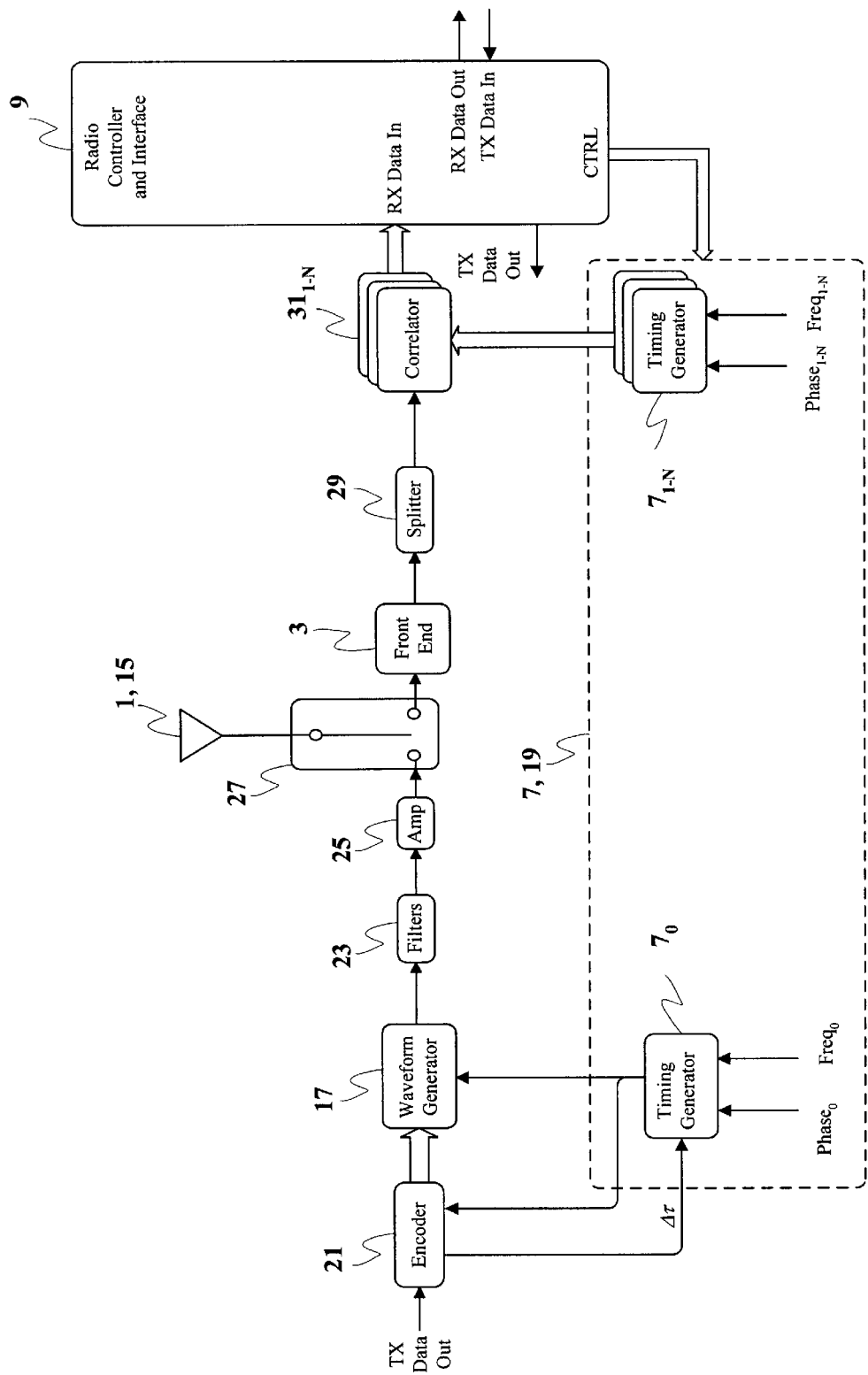
FIG. 2 is a block diagram of the transceiver of FIG. 1a, that manipulates a shape of UWB pulses, according to the present invention.

FIG. 2 is a block diagram of a transceiver embodiment of the present invention in which the modulation scheme employed is able to manipulate the shape and time of the UWB pulses. In FIG. 2, when receiving energy through the antenna 1, 15 (e.g., corresponding antennas 1 and 15 of FIG. 1a) the energy is coupled in to a transmit/receive (T/R) switch 27, which passes the energy to a radio front end 3. The radio front end 3 filters, extracts noise, and adjusts the amplitude of the signal before providing the same to a splitter 29. The splitter 29 divides the signal up into one of N different signals and applies the N different signals to different tracking correlators $31_1$–$31_N$. Each of the tracking correlators $31_1$–$31_N$ receives a clock input signal from a respective timing generator $7_1$–$7_N$ of a timing generator module 7, 19, as shown in FIG. 2.

The timing generators $7_1$–$7_N$, for example, receive a phase and frequency adjustment signal, as shown in FIG. 2, but may also receive a fast modulation signal or other control signal(s) as well. The radio controller and interface 9 provides the control signals, such as phase, frequency and fast modulation signals, etc., to the timing generator module 7, 19, for time synchronization and modulation control. The fast modulation control signal may be used to implement, for example, chirp waveforms, PPM waveforms, such as fast time scale PPM waveforms, etc.

The radio controller and interface 9 also provides control signals to, for example, the encoder 21, the waveform generator 17, the filters 23, the amplifier 25, the T/R switch 27, the front end 3, the tracking correlators $31_1$–$31_N$ (corresponding to the UWB waveform correlator 5 of FIG. 1a), etc., for controlling, for example, amplifier gains, signal waveforms, filter passbands and notch functions, alternative demodulation and detecting processes, user codes, spreading codes, cover codes, etc.

During signal acquisition, the radio controller and interface 9 adjusts the phase input of, for example, the timing generator $7_1$, in an attempt for the tracking correlator $31_1$ to identify and the match the timing of the signal produced at the receiver with the timing of the arriving signal. When the received signal and the locally generated signal coincide in time with one another, the radio controller and interface 9 senses the high signal strength or high SNR and begins to track, so that the receiver is synchronized with the received signal.

Once synchronized, the receiver will operate in a tracking mode, where the timing generator $7_1$ is adjusted by way of a continuing series of phase adjustments to counteract any differences in timing of the timing generator $7_1$ and the incoming signal. However, a feature of the present invention is that by sensing the mean of the phase adjustments over a known period of time, the radio controller and interface 9 adjusts the frequency of the timing generator $7_1$ so that the mean of the phase adjustments becomes zero. The frequency is adjusted in this instance because it is clear from the pattern of phase adjustments that there is a frequency offset between the timing generator $7_1$ and the clocking of the received signal. Similar operations may be performed on timing generators $7_2$–$7_N$, so that each receiver can recover the signal delayed by different amounts, such as the delays caused by multipath (i.e., scattering along different paths via reflecting off of local objects).

A feature of the transceiver in FIG. 2 is that it includes a plurality of tracking correlators $31_1$–$31_N$. By providing a plurality of tracking correlators, several advantages are obtained. First, it is possible to achieve synchronization more quickly (i.e., by operating parallel sets of correlation arms to find strong SNR points over different code-wheel segments). Second, during a receive mode of operation, the multiple arms can resolve and lock onto different multipath components of a signal. Through coherent addition, the UWB communication system uses the energy from the different multipath signal components to reinforce the received signal, thereby improving signal to noise ratio. Third, by providing a plurality of tracking correlator arms, it is also possible to use one arm to continuously scan the channel for a better signal than is being received on other arms.

In one embodiment of the present invention, if and when the scanning arm finds a multipath term with higher SNR than another arm that is being used to demodulate data, the role of the arms is switched (i.e., the arm with the higher SNR is used to demodulate data, while the arm with the lower SNR begins searching). In this way, the communications system dynamically adapts to changing channel conditions.

The radio controller and interface 9 receives the information from the different tracking correlators $31_1$–$3_{1N}$ and decodes the data. The radio controller and interface 9 also provides control signals for controlling the front end 3, e.g., such as gain, filter selection, filter adaptation, etc., and adjusting the synchronization and tracking operations by way of the timing generator module 7, 19.

In addition, the radio controller and interface 9 serves as an interface between the communication link feature of the present invention and other higher level applications that will use the wireless UWB communication link for performing other functions. Some of these functions would include, for example, performing range-finding operations, wireless telephony, file sharing, personal digital assistant (PDA) functions, embedded control functions, location-finding operations, etc.

On the transmit portion of the transceiver shown in FIG. 2, a timing generator $7_0$ also receives phase, frequency and/or fast modulation adjustment signals for use in encoding a UWB waveform from the radio controller and interface 9. Data and user codes (via a control signal) are provided to the encoder 21, which in the case of an embodiment of the present invention utilizing time-modulation, passes command signals (e.g., Δt) to the timing generator $7_0$ for providing the time at which to send a pulse. In this way, encoding of the data into the transmitted waveform may be performed.

When the shape of the different pulses are modulated according to the data and/or codes, the encoder 21 produces the command signals as a way to select different shapes for generating particular waveforms in the waveform generator 17. For example, the data may be grouped in multiple data bits per channel symbol. The waveform generator 17 then produces the requested waveform at a particular time as indicated by the timing generator $7_0$. The output of the waveform generator is then filtered in filter 23 and amplified in amplifier 25 before being transmitted via antenna 1, 15 by way of the T/R switch 27.

In another embodiment of the present invention, the transmit power is set low enough that the transmitter and receiver are simply alternately powered down without need for the T/R switch 27. Also, in some embodiments of the present invention, neither the filter 23 nor the amplifier 25 is needed, because the desired power level and spectrum is directly useable from the waveform generator 17. In addition, the filters 23 and the amplifier 25 may be included in the waveform generator 17 depending on the implementation of the present invention.

A feature of the UWB communications system disclosed, is that the transmitted waveform x(t) can be made to have a nearly continuous power flow, for example, by using a high chipping rate, where the wavelets g(t) are placed nearly back-to-back. This configuration allows the system to operate at low peak voltages, yet produce ample average transmit power to operate effectively. As a result, sub-micron geometry CMOS switches, for example, running at a one-volt levels, can be used to directly drive antenna 1, 15, such that the amplifier 25 is not required. In this way, the entire radio can be integrated on a single monolithic integrated circuit.

Under certain operating conditions, the system can be operated without the filters 23. If, however, the system is to be operated, for example, with another radio system, the filters 23 can be used to provide a notch function to limit interference with other radio systems. In this way, the system can operate simultaneously with other radio systems, providing advantages over conventional devices that use avalanching type devices connected straight to an antenna, such that it is difficult to include filters therein.

The UWB transceiver of FIG. 1a or 2 may be used to perform a radio transport function for interfacing with different applications as part of a stacked protocol architecture. In such a configuration, the UWB transceiver performs signal creation, transmission and reception functions as a communications service to applications that send data to the transceiver and receive data from the transceiver much like a wired I/O port. Moreover, the UWB transceiver may be used to provide a wireless communications function to any one of a variety of devices that may include interconnection to other devices either by way of wired technology or wireless technology. Thus, the UWB transceiver of FIG. 1a or 2 may be used as part of a local area network (LAN) connecting fixed structures or as part of a wireless personal area network (WPAN) connecting mobile devices, for example. In any such implementation, all or a portion of the present invention may be conveniently implemented in a microprocessor system using conventional general purpose microprocessors programmed according to the teachings of the present invention, as will be apparent to those skilled in the microprocessor systems art. Appropriate software can be readily prepared by programmers of ordinary skill based on the teachings of the present disclosure, as will be apparent to those skilled in the software art.

Figure 3:
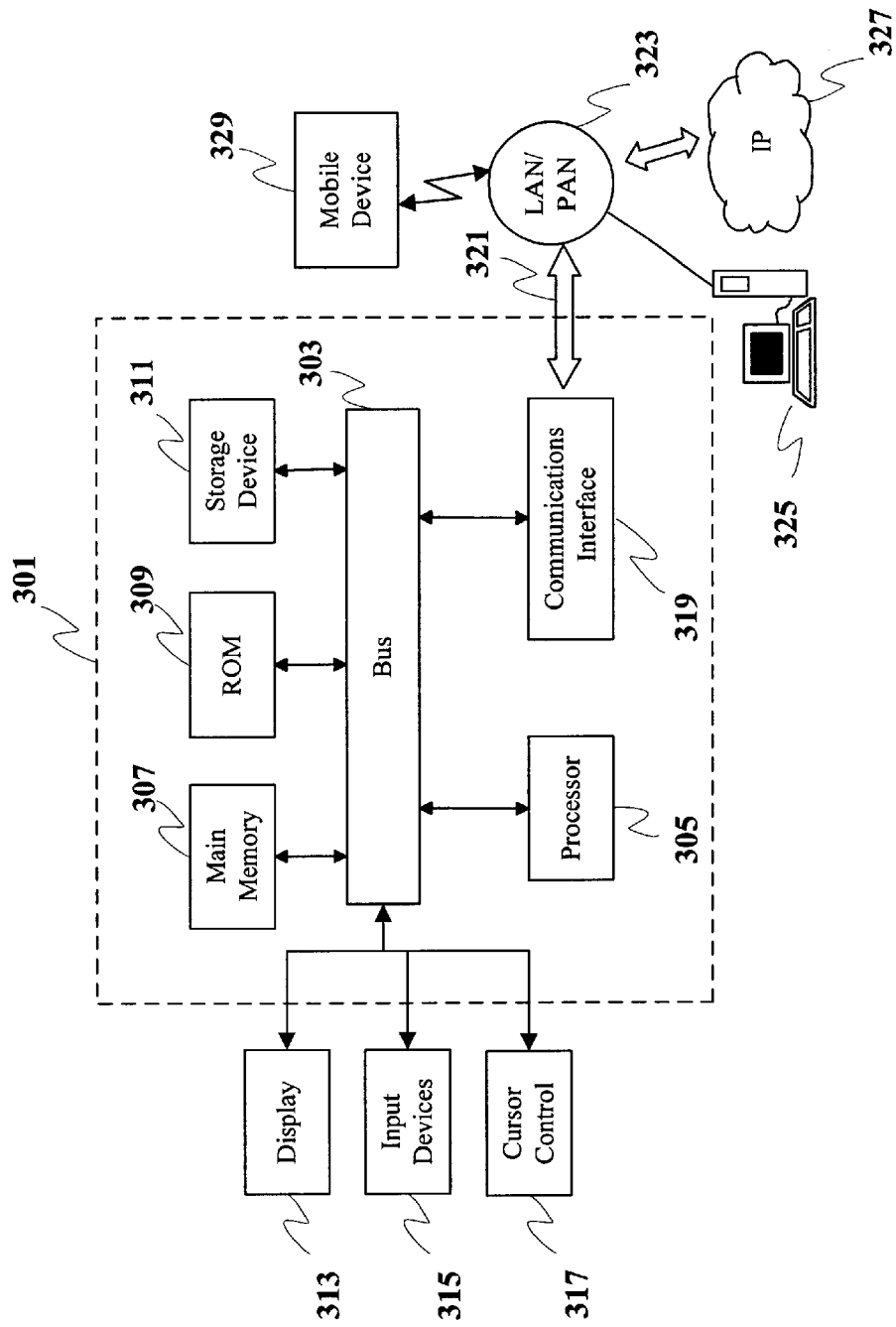
FIG. 3 is a schematic illustration of a general-purpose microprocessor-based or digital signal processor-based system, which can be programmed according to the teachings of the present invention.

FIG. 3 illustrates a processor system 301 upon which an embodiment according to the present invention may be implemented. The system 301 includes a bus 303 or other communication mechanism for communicating information, and a processor 305 coupled with the bus 303 for processing the information. The processor system 301 also includes a main memory 307, such as a random access memory (RAM) or other dynamic storage device (e.g., dynamic RAM (DRAM), static RAM (SRAM), synchronous DRAM (SDRAM), flash RAM), coupled to the bus 303 for storing information and instructions to be executed by the processor 305. In addition, a main memory 307 may be used for storing temporary variables or other intermediate information during execution of instructions to be executed by the processor 305. The system 301 further includes a read only memory (ROM) 309 or other static storage device (e.g., programmable ROM (PROM), erasable PROM (EPROM), and electrically erasable PROM (EEPROM)) coupled to the bus 303 for storing static information and instructions for the processor 305. A storage device 311, such as a magnetic disk or optical disc, is provided and coupled to the bus 303 for storing information and instructions.

The processor system 301 may also include special purpose logic devices (e.g., application specific integrated circuits (ASICs)) or configurable logic devices (e.g, simple programmable logic devices (SPLDs), complex programmable logic devices (CPLDs), or re-programmable field programmable gate arrays (FPGAs)). Other removable media devices (e.g., a compact disc, a tape, and a removable magneto-optical media) or fixed, high density media drives, may be added to the system 301 using an appropriate device bus (e.g., a small system interface (SCSI) bus, an enhanced integrated device electronics (IDE) bus, or an ultra-direct memory access (DMA) bus). The system 301 may additionally include a compact disc reader, a compact disc reader-writer unit, or a compact disc juke box, each of which may be connected to the same device bus or another device bus.

The processor system 301 may be coupled via the bus 303 to a display 313, such as a cathode ray tube (CRT) or liquid crystal display (LCD) or the like, for displaying information to a system user. The display 313 may be controlled by a display or graphics card. The processor system 301 includes input devices, such as a keyboard or keypad 315 and a cursor control 317, for communicating information and command selections to the processor 305. The cursor control 317, for example, is a mouse, a trackball, or cursor direction keys for communicating direction information and command selections to the processor 305 and for controlling cursor movement on the display 313. In addition, a printer may provide printed listings of the data structures or any other data stored and/or generated by the processor system 301.

The processor system 301 performs a portion or all of the processing steps of the invention in response to the processor 305 executing one or more sequences of one or more instructions contained in a memory, such as the main memory 307. Such instructions may be read into the main memory 307 from another computer-readable medium, such as a storage device 311. One or more processors in a multi-processing arrangement may also be employed to execute the sequences of instructions contained in the main memory 307. In alternative embodiments, hard-wired circuitry may be used in place of or in combination with software instructions. Thus, embodiments are not limited to any specific combination of hardware circuitry and software.

As stated above, the processor system 301 includes at least one computer readable medium or memory programmed according to the teachings of the invention and for containing data structures, tables, records, or other data described herein. Stored on any one or on a combination of computer readable media, the present invention includes software for controlling the system 301, for driving a device or devices for implementing the invention, and for enabling the system 301 to interact with a human user. Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpreted or executable code mechanism, including but not limited to scripts, interpretable programs, dynamic link libraries, Java or other object oriented classes, and complete executable programs. Moreover, parts of the processing of the present invention may be distributed for better performance, reliability, and/or cost.

The term "computer readable medium" as used herein refers to any medium that participates in providing instructions to the processor 305 for execution. A computer readable medium may take many forms, including but not limited to, non-volatile media, volatile media, and transmission media. Non-volatile media includes, for example, optical, magnetic disks, and magneto-optical disks, such as the storage device 311. Volatile media includes dynamic memory, such as the main memory 307. Transmission media includes coaxial cables, copper wire and fiber optics, including the wires that comprise the bus 303. Transmission media may also take the form of acoustic or light waves, such as those generated during radio wave and infrared data communications.

Common forms of computer readable media include, for example, hard disks, floppy disks, tape, magneto-optical disks, PROMs (EPROM, EEPROM, Flash EPROM), DRAM, SRAM, SDRAM, or any other magnetic medium, compact disks (e.g., CD-ROM), or any other optical medium, punch cards, paper tape, or other physical medium with patterns of holes, a carrier wave, carrierless transmissions, or any other medium from which a system can read.

Various forms of computer readable media may be involved in providing one or more sequences of one or more instructions to the processor 305 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to system 301 may receive the data on the telephone line and use an infrared transmitter to convert the data to an infrared signal. An infrared detector coupled to the bus 303 can receive the data carried in the infrared signal and place the data on the bus 303. The bus 303 carries the data to the main memory 307, from which the processor 305 retrieves and executes the instructions. The instructions received by the main memory 307 may optionally be stored on a storage device 311 either before or after execution by the processor 305.

The processor system 301 also includes a communication interface 319 coupled to the bus 303. The communications interface 319 provides a two-way UWB data communication coupling to a network link 321 that is connected to a communications network 323 such as a local network (LAN) or personal area network (PAN) 323. For example, the communication interface 319 may be a network interface card to attach to any packet switched UWB-enabled personal area network (PAN) 323. As another example, the communication interface 319 may be a UWB accessible asymmetrical digital subscriber line (ADSL) card, an integrated services digital network (ISDN) card, or a modem to provide a data communication connection to a corresponding type of communications line. The communications interface 319 may also include the hardware to provide a two-way wireless communications coupling other than a UWB coupling, or a hardwired coupling to the network link 321. Thus, the communications interface 319 may incorporate the UWB transceiver of FIG. 2 as part of a universal interface that includes hardwired and non-UWB wireless communications coupling to the network link 321.

The network link 321 typically provides data communication through one or more networks to other data devices. For example, the network link 321 may provide a connection through a LAN to a host computer 325 or to data equipment operated by a service provider, which provides data communication services through an IP (Internet Protocol) network 327. Moreover, the network link 321 may provide a connection through a PAN 323 to a mobile device 329 such as a personal digital assistant (PDA) laptop computer, or cellular telephone. The LAN/PAN communications network 323 and IP network 327 both use electrical, electromagnetic or optical signals that carry digital data streams. The signals through the various networks and the signals on the network link 321 and through the communication interface 319, which carry the digital data to and from the system 301, are exemplary forms of carrier waves transporting the information. The processor system 301 can transmit notifications and receive data, including program code, through the network(s), the network link 321 and the communication interface 319.

What is claimed:

1. A method for receiving digital information in an ultra wideband wireless signal, comprising:

receiving an ultra wideband waveform via an antenna, the ultra wideband waveform including a plurality of signal wavelets; and decoding the plurality of signal wavelets into the digital information, wherein the plurality of signal wavelets comprises a plurality of first wavelets having a first wavelet shape, and a plurality of second wavelets having a second wavelet shape that is different from the first wavelet shape.

2. A method for receiving digital information in an ultra wideband wireless signal, as recited in claim 1, wherein the second wavelet shape is equivalent to an inverted first wavelet shape.

3. A method for receiving digital information in an ultra wideband wireless signal, as recited in claim 1, wherein the first wavelet shape is one of a Gaussian function and a sinusoidal function.

4. A method for receiving digital information in an ultra wideband wireless signal, as recited in claim 1, wherein the plurality of signal wavelets further comprises a plurality of third wavelets having a third wavelet shape.

5. A method for receiving digital information in an ultra wideband wireless signal, as recited in claim 4, wherein the second wavelet shape is equivalent to an inverted first wavelet shape, and wherein the third wavelet shape is equal to the first wavelet shape multiplied in amplitude by an integer.

6. A method for receiving digital information in an ultra wideband wireless signal, as recited in claim 1, wherein each of the plurality of the signal wavelets represents N bits of the digital information, N being an integer greater than zero.

7. A method for receiving digital information in an ultra wideband wireless signal, as recited in claim 1, wherein each bit of the digital information is represented by two or more of the plurality of the signal wavelets.

8. A method for receiving digital information in an ultra wideband wireless signal, as recited in claim 1, wherein the method is implemented in an integrated circuit.

9. A method for receiving digital information in an ultra wideband wireless signal, as recited in claim 1, wherein the decoding of the plurality of signal wavelets into the digital information comprises correlating each of the plurality of signal wavelets with one or more locally-generated wavelets.

10. A device for receiving digital information in an ultra wideband wireless signal, comprising:

a reception path configured to receive a plurality of signal wavelets as ultra wideband energy, each of the plurality of signal wavelets having one of M different wavelet shapes;

a decoder configured to receive the plurality of signal wavelets and to generate a plurality of state indicators representing a plurality of bits of the digital information, wherein each of the plurality of state indicators is indicative of an actual wavelet shape of one or more of the plurality of signal wavelets, wherein M is an integer greater than one.

11. A device for receiving digital information in an ultra wideband wireless signal, as recited in claim 10, wherein the M different wavelet shapes include a first wavelet shape and a second wavelet shape equivalent to an inverted first wavelet shape.

12. A device for receiving digital information in an ultra wideband wireless signal, as recited in claim 11, wherein the first wavelet shape is one of a Gaussian function and a sinusoidal function.

13. A device for receiving digital information in an ultra wideband wireless signal, as recited in claim 11, wherein the M different wavelet shapes further includes a third wavelet shape equivalent to the first wavelet shape multiplied in amplitude by an integer.

14. A device for receiving digital information in an ultra wideband wireless signal, as recited in claim 10, wherein the reception path comprises an ultra wideband antenna.

15. A device for receiving digital information in an ultra wideband wireless signal, as recited in claim 10, wherein the decoder comprises a correlator configured to receive the plurality of signal wavelets and one or more locally-generated wavelets, and to generate a plurality of correlation values as the plurality of corresponding state indicators.

16. A device for receiving digital information in an ultra wideband wireless signal, as recited in claim 15, further comprising a controller for receiving the plurality of corresponding state indicators and generating a bit signal containing the plurality of bits of the digital information.

17. A device for receiving digital information in an ultra wideband wireless signal, as recited in claim 10, wherein the state indicators directly indicate values of the plurality of bits of the digital information.

18. A device for receiving digital information in an ultra wideband wireless signal, as recited in claim 10, wherein each of the plurality of the signal wavelets represents N bits of the plurality of bits of digital information, N being an integer greater than zero.

19. A device for receiving digital information in an ultra wideband wireless signal, as recited in claim 10, wherein each bit of the digital information is represented by two or more of the plurality of the signal wavelets.

20. A method for receiving digital information in an ultra wideband wireless signal, comprising:

receiving an ultra wideband waveform via an antenna, the ultra wideband waveform including a plurality of signal wavelets;

correlating the plurality of signal wavelets with one or more locally-generated wavelets to create a plurality of correlation values; and determining the digital information based on the plurality of correlation values, wherein the plurality of signal wavelets comprises a plurality of first wavelets having a first wavelet shape, and a plurality of second wavelets having a second wavelet shape that is different from the first wavelet shape.

* * * * *

UNITED STATES PATENT AND TRADEMARK OFFICE
CERTIFICATE OF CORRECTION

PATENT NO. : 6,850,733 B2
DATED : February 1, 2005
INVENTOR(S) : Martin Rofheart and John W. McCorkle It is certified that error appears in the above-identified patent and that said Letters Patent is hereby corrected as shown below:

<u>Title page,</u>
Item [56], References Cited, U.S. PATENT DOCUMENTS should read as follows:

| | | | | | |
|---|---|---|---|---|---|
| 4,641,317 | A | * | 2/1987 | Fullerton | 375/130 |
| 5,345,471 | A | * | 9/1994 | McEwan | 375/130 |
| 5,351,053 | A | * | 9/1994 | Wicks et al. | 342/158 |
| 5,523,760 | A | * | 6/1996 | McEwan | 342/89 |
| 5,533,046 | A | * | 7/1996 | Lund | 375/130 |
| 5,583,892 | A | * | 12/1996 | Drakul et al. | 375/353 |
| 5,589,838 | A | * | 12/1996 | McEwan | 342/387 |
| 5,677,929 | A | * | 10/1997 | Asano et al. | 375/141 |
| 5,687,169 | A | * | 11/1997 | Fullerton | 370/324 |
| 5,832,035 | A | * | 11/1998 | Fullerton | 375/149 |
| 5,901,172 | A | * | 5/1999 | Fontana et al. | 375/130 |
| 6,026,125 | A | * | 2/2000 | Larrick et al. | 375/295 |
| 6,505,032 | B1 | * | 1/2003 | McCorkle et al. | 455/41.2 |
| 6,351,246 | | | 2/2002 | McCorkle | |
| 6,700,939 | | | 2/2004 | McCorkle | |
| 6,735,238 | | | 5/2004 | McCorkle | |
| 60/207,225 | | | 5/2000 | McCorkle | |
| 60/217,099 | | | 7/2000 | Miller | |
| 09/633,815 | | | 8/2000 | McCorkle | |
| 60/238,466 | | | 10/2000 | McCorkle | |
| 09/684,401 | | | 10/2000 | Miller | |

UNITED STATES PATENT AND TRADEMARK OFFICE
CERTIFICATE OF CORRECTION

PATENT NO. : 6,850,733 B2
DATED : February 1, 2005
INVENTOR(S) : Martin Rofheart and John W. McCorkle It is certified that error appears in the above-identified patent and that said Letters Patent is hereby corrected as shown below:

<u>Title page (cont'd),</u>

| | | |
|---|---|---|
| 09/684,782 | 10/2000 | McCorkle |
| 09/685,195 | 10/2000 | Miller |
| 09/685,196 | 10/2000 | Miller |
| 09/685,197 | 10/2000 | Miller |
| 09/685,198 | 10/2000 | McCorkle |
| 09/685,199 | 10/2000 | McCorkle |
| 09/685,200 | 10/2000 | McCorkle |
| 09/685,202 | 10/2000 | Rofheart |
| 09/685,203 | 10/2000 | Miller |
| 09/685,205 | 10/2000 | McCorkle |

\* cited by examiner

Signed and Sealed this

Third Day of May, 2005

JON W. DUDAS
*Director of the United States Patent and Trademark Office*